US006487406B1

(12) United States Patent
Chang et al.

(10) Patent No.: US 6,487,406 B1
(45) Date of Patent: Nov. 26, 2002

(54) PCS-TO-MOBILE IP INTERNETWORKING

(75) Inventors: Li-Fung Chang, Holmdel, NJ (US); Vijay K. Varma, Holmdel, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/545,619

(22) Filed: Apr. 10, 2000

Related U.S. Application Data

(60) Provisional application No. 60/139,471, filed on Jun. 16, 1999.

(51) Int. Cl.[7] .................................................. H04Q 7/38
(52) U.S. Cl. ........................ 455/426; 455/432; 455/445; 370/401
(58) Field of Search ................................ 455/426, 445, 455/460, 432, 433, 436; 370/401, 338; 709/238, 239

(56) References Cited

U.S. PATENT DOCUMENTS 5,956,331 A * 9/1999 Rautiola et al. ............ 370/338
6,374,108 B1 * 4/2002 Jakobsen et al. ........... 455/432
6,396,828 B1 * 5/2002 Liu ............................ 370/352

* cited by examiner

Primary Examiner—Lee Nguyen
(74) Attorney, Agent, or Firm—Joseph Giordano

(57) ABSTRACT

A method and system for providing seamless mobile IP connectivity between mobile stations (MS) connected to a PCS network via base stations (BS) connected to base station switching centers (BSCs). The BSCs are connected to a mobile station switching station (MSC) and are configured to direct voice traffic from the MS to the MSC. A gateway router (GR) is connected between the BSCs and the Internet and each BSC is configured as an IP data node. One or more subnets are defined, each of which includes at least one BSC. Each MS is assigned a permanent IP address and associated with a home subnet. When the system detects that the MS is connected to a BSC outside of its home subnet, it is assigned a care-of address to the MS to which IP data can be forwarded. IP data from the MS is routed through the GR. IP data directed to the MS is directed to the MS's permanent IP address. If the MS is connected to a BSC outside of its home subnet, the data traffic is forwarded to the MS's care-of address. A mobile station and base station controller for use in such a network is also presented.

28 Claims, 12 Drawing Sheets

PCS-TO-MOBILE IP INTERNETWORKING

CROSS REFERENCE TO RELATED APPLICATIONS:

This application claims priority from U.S. Provisional Application Serial No. 60/139,471, filed Jun. 16, 1999 and entitled "PCS-TO-MOBILE IP INTERNETWORKING".

FIELD OF THE INVENTION

The present invention relates generally to the use of Mobile Internet Protocol ("IP") systems, methods, and protocols in PCS systems to provide seamless mobility across multiple PCS data networks and IP networks.

BACKGROUND OF THE INVENTION

With the proliferation of wireless cellular devices, an increasing need has arisen for a methodology and system to provide seamless mobile access to the Internet via existing personal communication services ("PCS") networks. To meet this need, the wireless access system must support high-speed packet data transmissions and also internetwork with the Internet backbone efficiently. While emerging PCS technologies, such as CDMA2000 and Wideband CDMA (WCDMA), define packet data transmission over the air interface, these systems do not present a flexible architecture for connecting a wireless access system to the Internet backbone which is also suitable for general mobile IP interconnectivity.

FIG. 1 is an illustration of a conventional cellular system network 10. The network 10 includes a mobile switching center ("MSC") 12 connected to one or more base station controllers ("BSC") 14. Each BSC 14 controls one or more base stations ("BS") 16 which provide wireless communication links to various mobile stations ("MS") 18. The MSC 12 interfaces to a public switched telephone network ("PSTN") 20 for routing the voice calls and to a separate signaling system 22 which provides signaling functionality used for PCS mobility management. Such a conventional cellular system provides Internet access through voiceband modems in the mobile stations which connect to an Internet access server interfaced to the MSC 12, either directly or via the PSTN 20. Alternatively, an interworking function (IWF) 24 interfaced directly to the MSC can support the interworking of protocols between the air interface and the Internet.

Although conventional cellular systems provide adequate data and voice service in some circumstances, this network configuration suffers from several deficiencies. In particular, the connection model is based on dialup modems where the IWF 24 acts as a server which provides a point-to-point connection to the MS 18 and assigns a temporary IP address to the MS that is valid only during the session. However, when an MS 18 changes its point of attachment with the Internet, a new session must be established and a new temporary address assigned to the MS 18. Thus, as the MS moves across different subnets, packet delivery to the MS is based on the temporary IP address and not the static IP address of the MS. This prevents the maintenance of an Internet session as the MS changes its point of attachment to the system. Because of the temporary address assignment to the MS in a visiting system, the MS can not act as a server. Further, SINCE the MS does not have a static IP address, datagrams cannot be delivered to the MS until the MS has independently established a Point-to-Point Protocol ("PPP") session and the host attempting to send data knows the MS=s temporary IP address.

Other systems for providing wireless Internet access, such as cellular digital packet data ("CDPD") and GSM packet radio service ("GPRS"), define specialized network protocols for packet-based wireless access techniques. However, CDPD network subsystems and mobility management designs are tightly coupled to a specific set of underlying lower layer protocols and are thus unsuitable for use with a wide variety of lower layer communications facilities. GPRS implementations maintain a strict separation between the radio subsystem and the network subsystem and rely on GSM mobility application protocol (MAP). In addition, to interwork with legacy networks, such as X.25, GPRS requires a complex layering of protocols. Thus, GPRS is also unsuitable for efficient implementation of Mobile IP functionality using various existing and emerging PCS systems.

Accordingly, it is an object of the present invention to provide a protocol and mobility management design for wireless Internet communication which can easily operate in conjunction with emerging and existing PCS technologies.

It is a further object of the invention to supply a protocol and system which provide seamless IP mobility across multiple PCS and IP networks while permitting any PCS air interface technology to be used.

SUMMARY OF THE INVENTION

According to the invention, a mobile IP architecture and methodology combine existing PCS structures with a separate IP network subsystem which employs Mobile IP techniques such that the mobile host has a static IP address but can still seamlessly change its point of attachment to the Internet.

In particular, each BSC in a PCS network is configured to route voice traffic to the MSC. Data traffic is routed to a separate gateway router which is connected between at least one BSC and the Internet. Mobile IP interconnectivity is provided on two levels—globally and within subnets in the the PCS network. Each subnet includes at least one BSC which controls one or more base stations for communicating with mobile stations. Each BSC is configured as an IP node on the subnet and is assigned its own IP address. Each mobile station is associated with a "home" subnet and assigned a permanent IP address, called the home address, which identifies the MS's home subnet and does not change with the location of the MS in the network. When the MS is outside its home subnet, it is assigned a temporary Care Of Address (COA) as discussed in detail below. The BSCs are interconnected together and to a Gateway Router ("GR") and the BSCs are configured to support IP layer functions and perform data routing based on a target MS=s IP address.

Each particular subnet in the PCS network is also provided with one or more mobility agents, preferably included within network IP routers. In a particular embodiment, two agents are used: a Home Agent ("HA") and a Foreign Agent ("FA"). The HA implements a router function that maintains the current location of each MS in the network which calls that particular subnet home. The FA implements a router function which is used to facilitate data communication with mobile stations connected to the particular subnet but foreign to it, i.e., they call another subnet home. When an MS connects outside of its home subnet, it is considered to be in a foreign network and is assigned a temporary COA. The mobility agents use the COA to coordinate the transmission of datagrams between a foreign MS and a remote site which directs communications to the MS's home network permanent IP address. Generally, the COA changes as the MS changes its point of attachment to the network. Preferably, mobile communication across subnets is accomplished through the Mobile IP methodology. This methodology, which was developed for use in LAN environments, defines a packet re-addressing approach that relies on agents and encapsulation to forward datagrams to the mobile host at its current location in the network.

According to the architecture of our invention, PCS registration and mobility management functions are executed using conventional mobility management functionality while mobility management of users accessing the Internet is based on Mobile IP architecture with additional support capabilities added to the BS-MS radio link. Advantageously, Mobile IP is flexible and can be used with any lower layer protocols. In addition, the architecture of our invention is general and maintains a strict separation between the radio subsystem and the network subsystem so that any PCS air interface technology may be used with the defined architecture. The protocols for internetworking require no changes to the Mobile IP methodology and only minimal enhancements to existing PCS signaling systems.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

Figure 1:
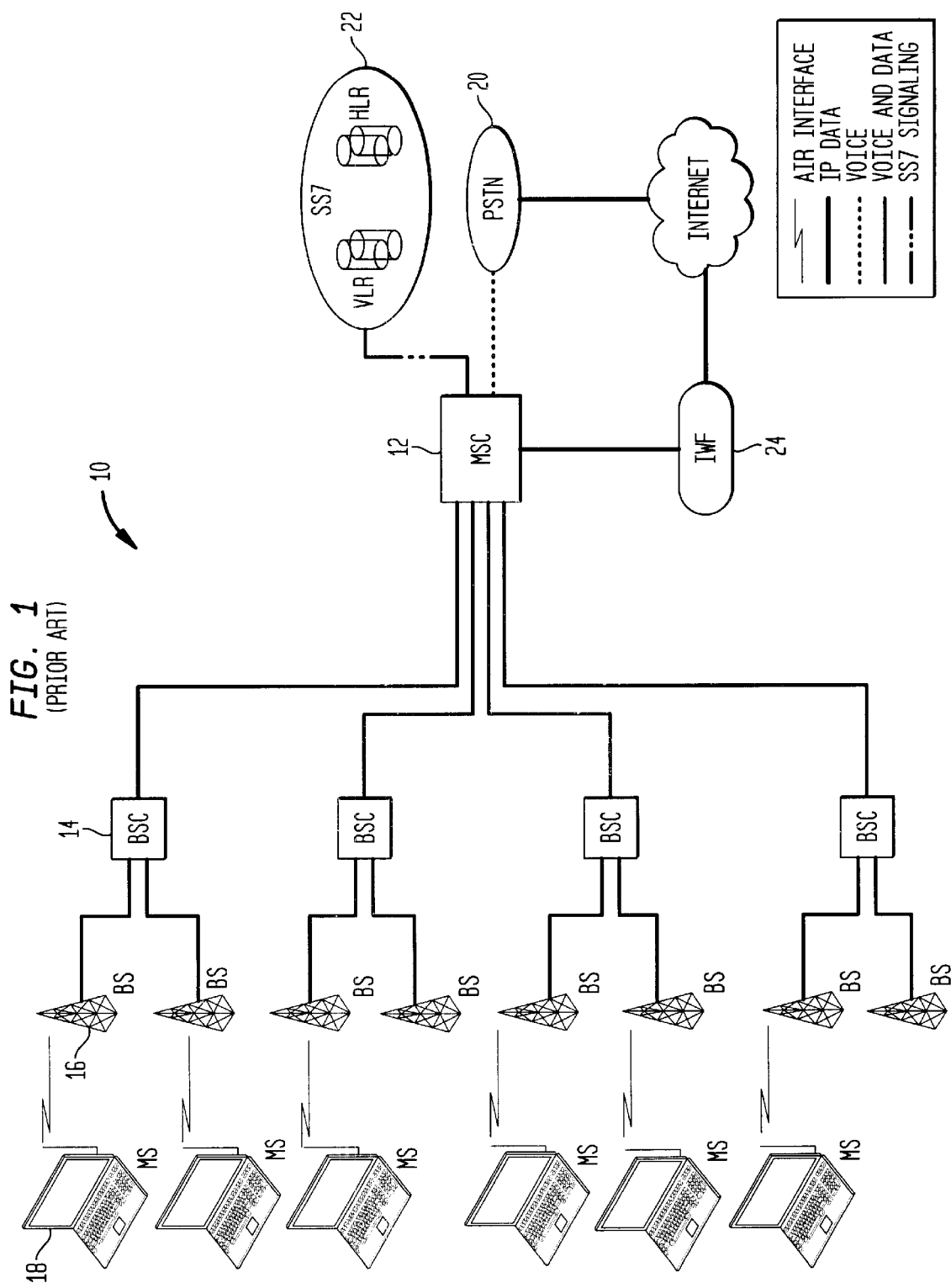
FIG. 1 is a diagram of a conventional cellular/PCS network.
Figure 2:
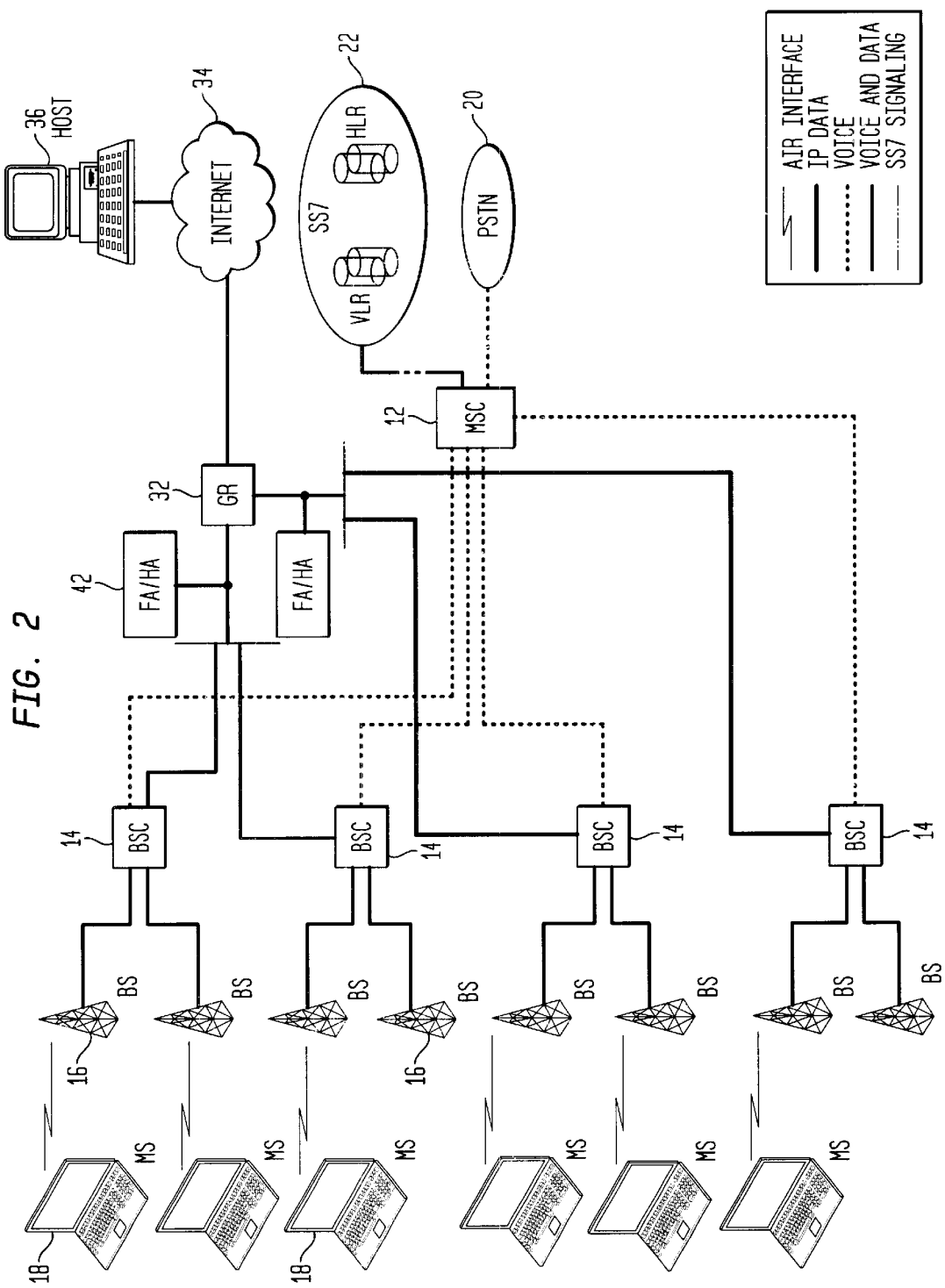
FIG. 2 is a diagram of a PCS voice and data network according to the invention.
Figure 3:
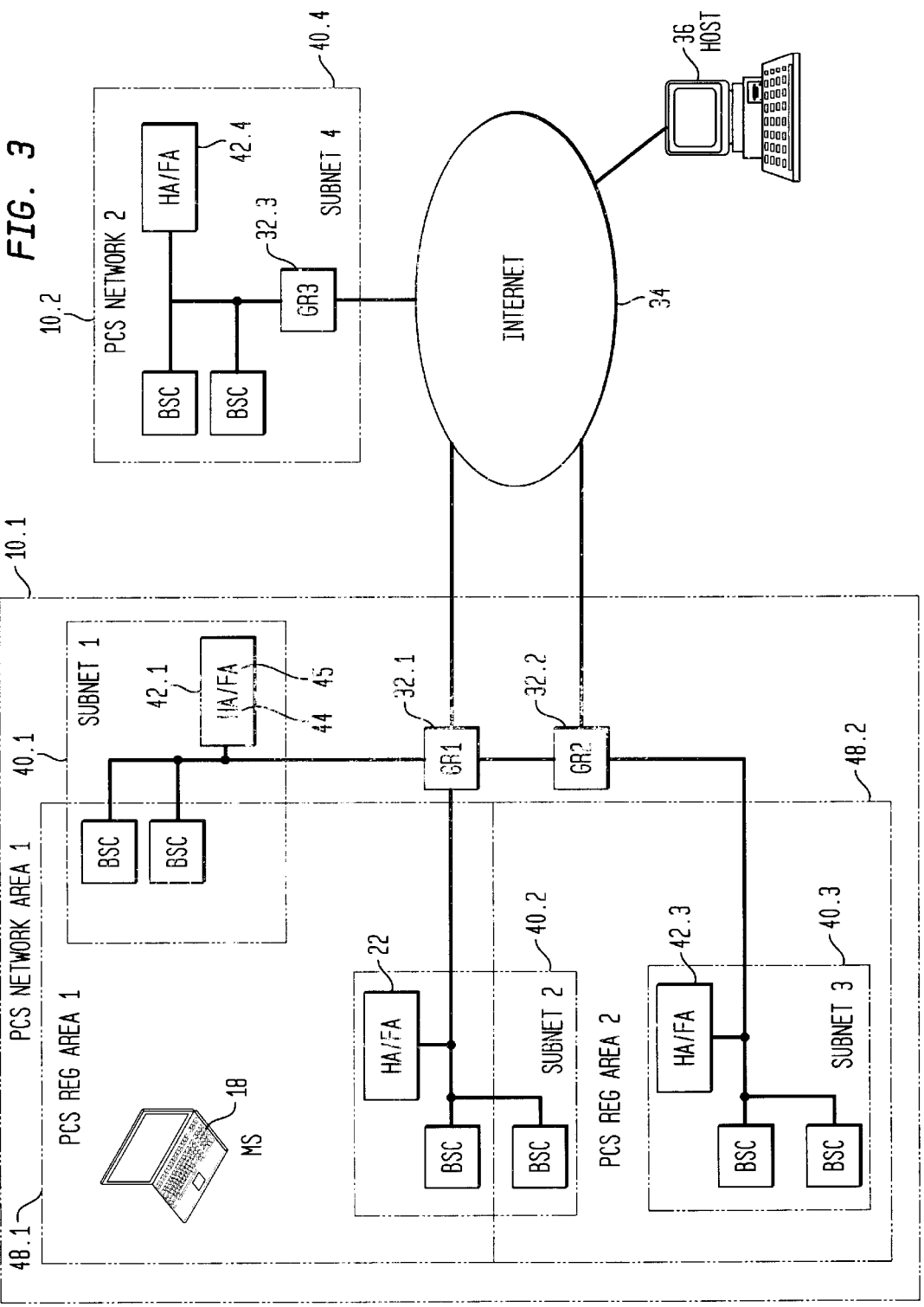
FIG. 3 is a diagram illustrating PCS registration areas and data subnets.

Turning to FIGS. 2 and 3, there is shown the architecture 30 of a system for mobile IP interconnectivity including a personal communication services ("PCS") voice and data network. (PCS mobility functions and base stations are not shown in FIG. 3 for ease of illustration). Advantageously, this architecture uses much of the infrastructure of a conventional PCS network used for providing voice service, such as shown in FIG. 1, and thus can be efficiently implemented on top of existing systems. As in conventional systems, the mobile stations ("MS") 18 use the same general physical channel over the air interface with the base stations ("BS") 16 for both voice and data (with some preferred protocol variations, discussed below). To provide more reliable and efficient transport for data traffic, a Radio Link Protocol ("RLP") suitable for bursty computer traffic, such as PACS Packet Channel Protocol, is employed over the air interface between the BS 16 and MS units 18. The base station controller ("BSC") 14 continues to route voice traffic to the PCS mobile station controller ("MSC") 12 where it is processed according to conventional PCS techniques. However, in contrast to conventional systems, data traffic is segregated from voice traffic at the BSC 14 and separately routed to a gateway router ("GR") 32. The gateway router 32 provides connectivity to a data network 34, such as the Internet, for accessing a remote data host 36. The gateway router 32 can also be connected to other BSCs 14 and other gateway routers 32.

In a preferred network structure, the overall data network includes one or more subnetworks or subnets 40, such as subnets 40.1–40.4 shown in FIG. 3, connected to a gateway router 32. Each subnet 40 encompasses at least one BSC 14 and mobility agents (HA/FA) 42.1–42.4 (or simply 42), which may include a Home Agent ("HA") for data users assigned to that subnet and a Foreign Agent ("FA") for data users roaming from other subnetworks. The functionality of the mobility agents will be discussed in more detail below.

Each subnet 40 exists within a particular PCS network 10. For example, the configuration illustrated in FIG. 3 includes two PCS networks (10.1, 10.2) and four data subnets (40.1–40.4). The first PCS network 10.1 includes three subnets 40.1–40.3 connected to two GRs 32.1, 32.2. The second PCS network 10.2 includes subnet 40.4 and GR 32.3. Each PCS network 10 may be subdivided into PCS registration areas 48. In FIG. 3, for example, the first PCS network 10.1 is divided into two PCS registration areas 48.1, 48.2 while the second PCS network 10.2 includes only a single registration area (not shown). The domain of a subnet 40 for data service and a PCS registration area are independent of each other. A data subnet may be a subset of a single PCS registration area, cover multiple PCS registration areas, or may overlap between two PCS registration areas. However, the PCS registration area is generally the same as a voice service registration area.

Each MS 18 is assigned a permanent IP address, called the home address, which identifies the mobile station=s home subnet and does not change with the location of the MS in the network. In the following examples referencing FIG. 3, it is assumed that the illustrated MS=s home subnet is the first subnet 40.1. When the MS 18 is away from its home subnet, it is assigned a temporary Care of Address (COA), which changes as the MS changes its point of attachment to the network. Mobility agents 42, which include a home agent 44 and foreign agent 45, are usually located in IP routers and provide mobility support to users. The home and foreign mobility agents can be integrated into a single module or be implemented as separate computer modules. The home agent 44 is a router function in an MS=s home network that maintains the current location of the MS in the network. When the MS is away from its home network, it is said to be in a foreign network and the foreign agent router fluction in that network forwards datagrams to and from the MS.

According to the invention, PCS registration and mobility management use the existing PCS mobility management network, such as the one illustrated in FIG. 1. However, mobility management of users accessing the Internet is based on the Mobile IP architecture with modifications to add additional capabilities to the radio link system. Specific scenarios wherein a MS is registered in a particular subnet or moves from one subnet into another are discussed below. The specific details of IP data communication to a registered MS 18 using the Mobile IP protocols are similar to the protocols used in conventional LAN networks which implement a Mobile IP architecture and will be known to those of skill in the art. Accordingly, post-registration IP data communication will not be specifically discussed in detail.

There are various factors which impact the mobility management design in this methodology. When the Mobile IP architecture is utilized, data registration areas follow Mobile IP registration procedures and each data registration area is the domain of a data subnet. In this mobile architecture, a data MS 18 can be in an Idle state or a Ready state. When in the Idle state, the MS 18 cannot be reached and datagrams directed to the MS cannot be delivered. When in the Ready state, the location of the MS 18 in the network is known and datagrams directed to the MS 18 are routed to the BS 16 serving that particular MS 18.

In addition, when an MS 18 is in the Ready state, that MS can be located within a communication cell. As the MS 18 moves between cells, the BS 16 that the MS is communicating with will be updated using a data location update procedure, discussed below. Further, when in the Ready state, the MS 18 may continuously monitor the channel for incoming packets or, alternatively, may enter a sleep mode. If the MS monitors the channel continuously, packets can be delivered without any prior alerts. However, because a sleep mode is a PCS feature and is not recognized by conventional Mobile IP protocol, the data network and external Internet community will not be aware of when a MS 18 is in the sleep mode. Thus, if an MS is in sleep mode, it must be alerted to incoming packets by the BS serving that MS. The data packets themselves are subsequently delivered within a short period following the alert. There is generally no need for the MS to respond to the alert, except to switch to the ready mode.

In operation, system information broadcast by the PCS network and received by each MS 18 includes a PCS registration area identification and a BS identification. Therefore, according to one aspect of the invention, when an MS 18 moves from one BS 16 to another, the MS 18 uses the data in the system information broadcast to determine if it has crossed a PCS registration area or not, and whether a PCS registration procedure must be performed. It can be appreciated that frequent transmission of Mobile IP registration parameters, such as a subnet mask, Agent Advertisement, etc., may consume a large quantity of system information bandwidth. According to a further aspect of the invention, Mobile IP registration parameters are instead conveyed to an MS 18 when a BSC 14 determines that an MS 18 has moved between different subnets. Thus, the information is transmitted to the MS only when it is specifically needed. Various MS registration scenarios will now be discussed with further reference to the example network configuration illustrated in FIG. 3 and the flow diagrams of FIGS. 4 and 5.

Figure 4:
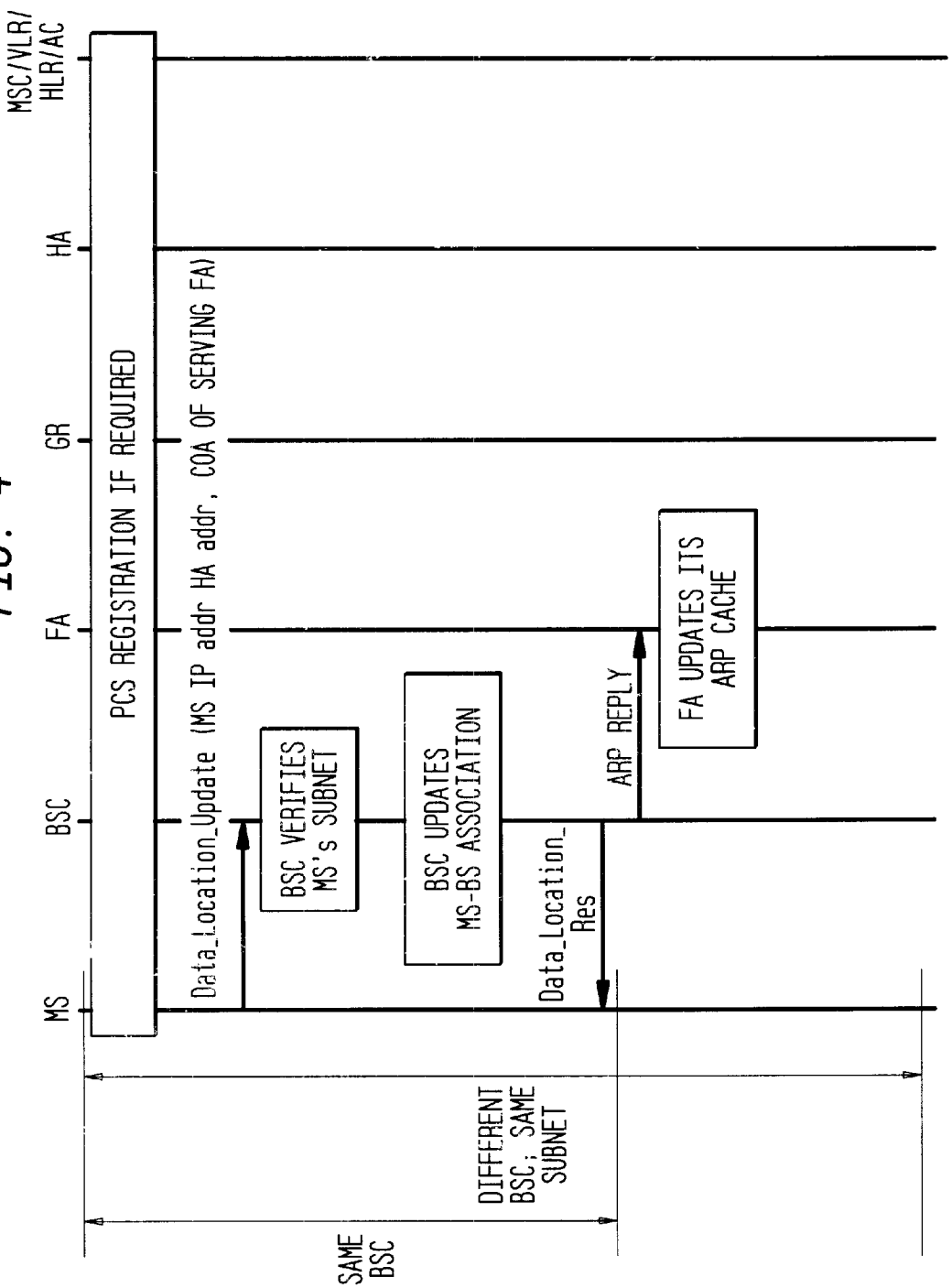
FIG. 4 is a flow diagram of a data location update when a mobile station moves between base station controllers in the same subnet.

Turning to FIG. 4, when an MS detects that it has moved from one BS to another, e.g., by examining information contained in a system broadcast containing the address of the associated BS, it sends a Data_Location_Update message to the BSC of the new BS. The message includes the MS=s IP address, its HA address and, if appropriate, the COA of the serving FA (which may be, e.g., the serving FA's IP address). The BSC receiving the Data_Location_Update message determines whether the MS has moved from a BS connected to the same BSC or from a BS connected to a different BSC. This determination is made by examining one or both of the HA and the COA data provided by the MS and possibly an MS-BS association table accessible to the BSC and which indicates to which BS each MS presently being serviced by the BSC is connected.

If the BS-MS association table indicates that the MS is registered with another BS under that BSC, the MS movement is within the same BSC. In this situation, the BSC updates the MS-BS association table to associate the MS with the newly accessed BS and then sends a Data_Location_Response to the MS which indicates that the relocation is successful. Because the MS is operating under the same BSC, that BSC will continue to receive the datagrams destined for the MS and forward them to the new BS in accordance with the updated MS-BS association table.

If the MS moves to a BS served by a different BSC, but the new BSC is within the same subnet as the old BSC, the identity of the MS will not initially be reflected in the MS-BS association table of the new BSC. (The necessary table updates are discussed below.) However, the COA of the serving FA will be that of the common subnet, since each subnet has only one FA. (If the MS is in its home network, the HA address provided will match that of the subnet and the HA will have no valid COA forwarding instructions). Because the new BS may belong to the same or to a different PCS registration area, prior to transmitting the Data_Location_Update message, the MS must determine whether a PCS registration is required before communications through the new BS are permitted. If the new BS is in the same PCS registration area, then the PCS registration procedure is not required; otherwise, PCS registration is performed according to conventional techniques appropriate for the underlying PCS network.

After any needed PCS registration procedures are completed, the MS initiates a data location update procedure with the data network as discussed above, wherein the new BSC updates its internal MS-BS association and sends a Data_Location_Response to the MS. In addition, in order to receive the packets destined for it at this new BSC, the MS instructs the mobility agents to update the address binding information to reflect the new BSC connection. In the Mobile IP protocol, this is accomplished by having the new BSC send an unsolicited Address Resolution Protocol ("ARP") reply to the subnet's FA instructing it to update the ARP cache binding in the FA for the particular MS with the physical address of the new BSC.

Figure 5:
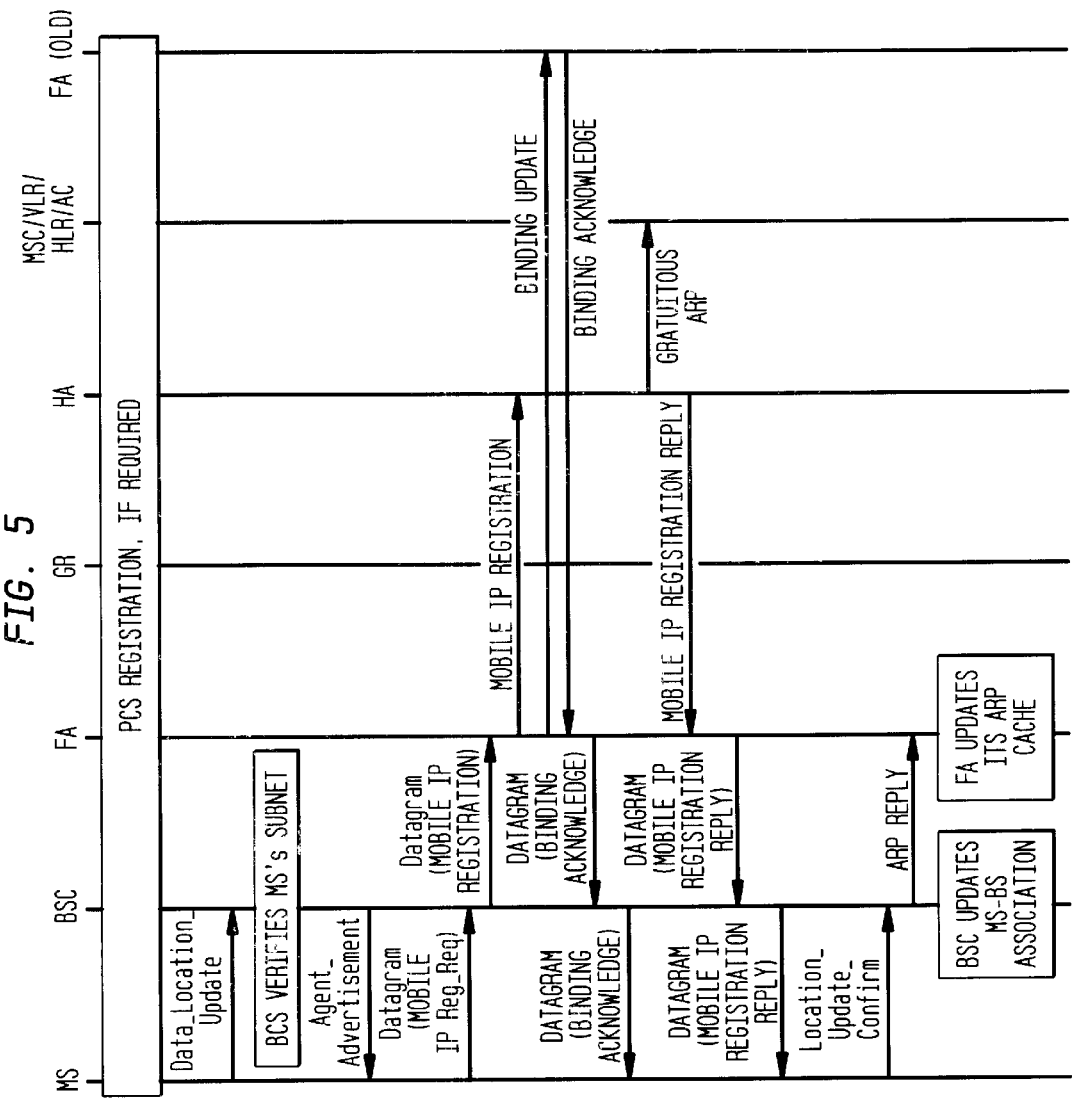
FIG. 5 is a flow diagram of a mobile IP registration procedure.

FIG. 5 is a flow diagram illustrating a registration procedure for the situation when an MS moves between subnets. The two subnets may belong to the same PCS registration area or to different PCS registration areas. Thus, the MS first determines whether the new BS is in a new PCS registration area and, if so, performs the necessary PCS registration.

Once any necessary PCS registration is complete, the MS initiates a data location update by sending a Data_Location_Update request to the new BSC, which request includes the MS's IP address, its HA address, and the COA of a serving FA, if any. In accordance with this information, the BSC determines if the MS is currently registered on a different subnet. Because an MS cannot determine on its own whether it has crossed a subnet boundary, the BSC must notify the MS that it has moved into a new subnet. This is preferably accomplished by means of an Agent Advertisement message sent from the BSC to the MS and which provides information needed for the MS to register itself in the new subnet. This information generally includes data identifying the FA of the new subnet, such as the FA's source address and a COA to be used to direct data to the new FA. A lifetime, indicating how long the connection will be valid, may also be transmitted.

Upon receiving the Agent Advertisement, the MS sends a datagram (a Mobile IP Registration Request message) to the BSC directed to the MS's HA. The datagram is a conventional LAN registration message and includes the information provided to the MS in the BSC's agent advertisement, (e.g., the IP addresses of the MS, FA, HA, COA, and the lifetime). Upon receiving the datagram, the BSC does not interpret the message, but instead forwards it to the present subnet's FA. The FA determines the MS=s HA and forwards the Mobile IP Registration Request message to the HA via one or more GRs and possibly the Internet.

In addition to forwarding the Mobile IP Registration Request message to the HA, if the MS is moving from one foreign subnet to another foreign subnet, the new FA also generates and sends a Binding Update message to the old FA. Upon its receipt, the old FA sends a Binding Acknowledge. This is forwarded by the FA via a Binding acknowledge datagram to the BSC and the BSC forwards the binding acknowledge datagram to the MS. Receipt of a binding acknowledge by the MS indicates that the MS has moved into a new subnet.

Upon receiving the registration datagram, the HA authenticates the MS. If the MS has just moved out of its home subnet and into a foreign subnet, the HA sends a Gratuitous ARP to all other nodes in the HA's subnet instructing them to associate the HA=s hardware address with the MS=s IP address so that datagrams destined for the MS may be intercepted by the HA and forwarded appropriately. Then, in each case, the HA sends a Mobile IP Registration Reply to the FA, which reply may include the lifetime of the registration. Upon receiving the reply from the MS's HA, the FA sends a Mobile IP Registration Reply via a datagram to the MS via its new BSC. The BSC does not interpret the message, but instead forwards the contents of the datagram to the MS. According to the invention, when the MS receives the registration reply, it responds by sending a Location_Update confirmatory message to the BSC confirming the success of the registration procedure. This response is processed by the BSC and can be considered to be acknowledgment of the initial agent advertisement.

Once the BSC is informed that the Mobile IP registration is complete, it updates its MS-BS association table to reflect the present connection of the MS so that the BSC can route the datagrams destined for this MS to the appropriate BS. The BSC also sends an ARP Reply message to the FA in its subnet instructing it to provide an association between the MS=s IP address and the BSC=s hardware address. In response, the FA updates its ARP cache for the MS with the hardware address of the BSC.

Figure 6:
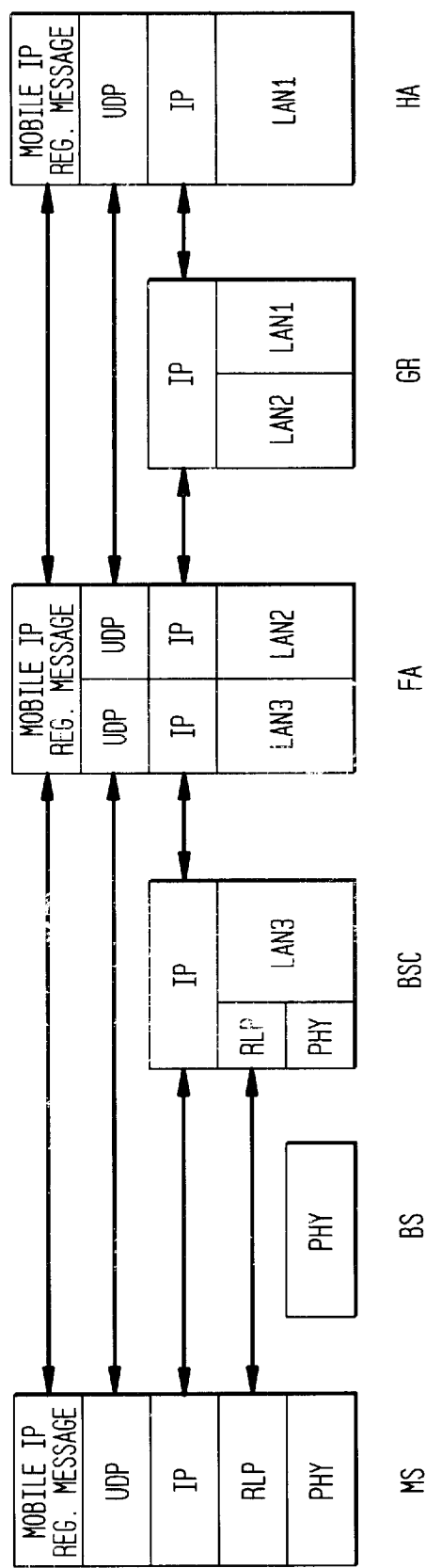
FIG. 6 is an illustration of the protocol layers used at various locations to support the mobile IP registration procedure of FIG. 5.

Because the MS, BS, BSC, FA, GR, and HA communicate with each other at different levels, various communication protocols may be used for different types of communication. FIG. 6 illustrates a protocol stack for the Mobile IP registration in which different protocols are used to communicate between the various network elements. As shown, various elements, such as the BS and BSC, do not interpret all protocols, but instead simply forward messages in these protocols to the indicated destination.

In the preferred embodiment, each MS is a Mobile IP-capable terminal which supports the protocol layers required for Mobile IP Registration messages. Mobile IP Registration messages are exchanged between the MS and the FA via the BSC and between the FA and the HA via the GR. Mobile IP Registration messages are transported using UDP/IP. Neither the BSC nor the GR interpret the Mobile IP Registration messages. Instead, these elements receive the messages via a lower level protocol and then forward them to the appropriate destination. The BS serves as a conduit between the BSC and the various MSs and has only physical layer functionality. Radio Link Protocol (RLP) is used for communication between the MS and the BSC. Use of this protocol does not need to extend beyond the BSC. The FA participates in the mobility management process of the MSs with the HA. Those of skill in the art will appreciate that various other interconnectivity protocols and protocol combinations can be used to achieve the communications between the various system elements needed to register a MS as it traverses the network.

Figure 11:
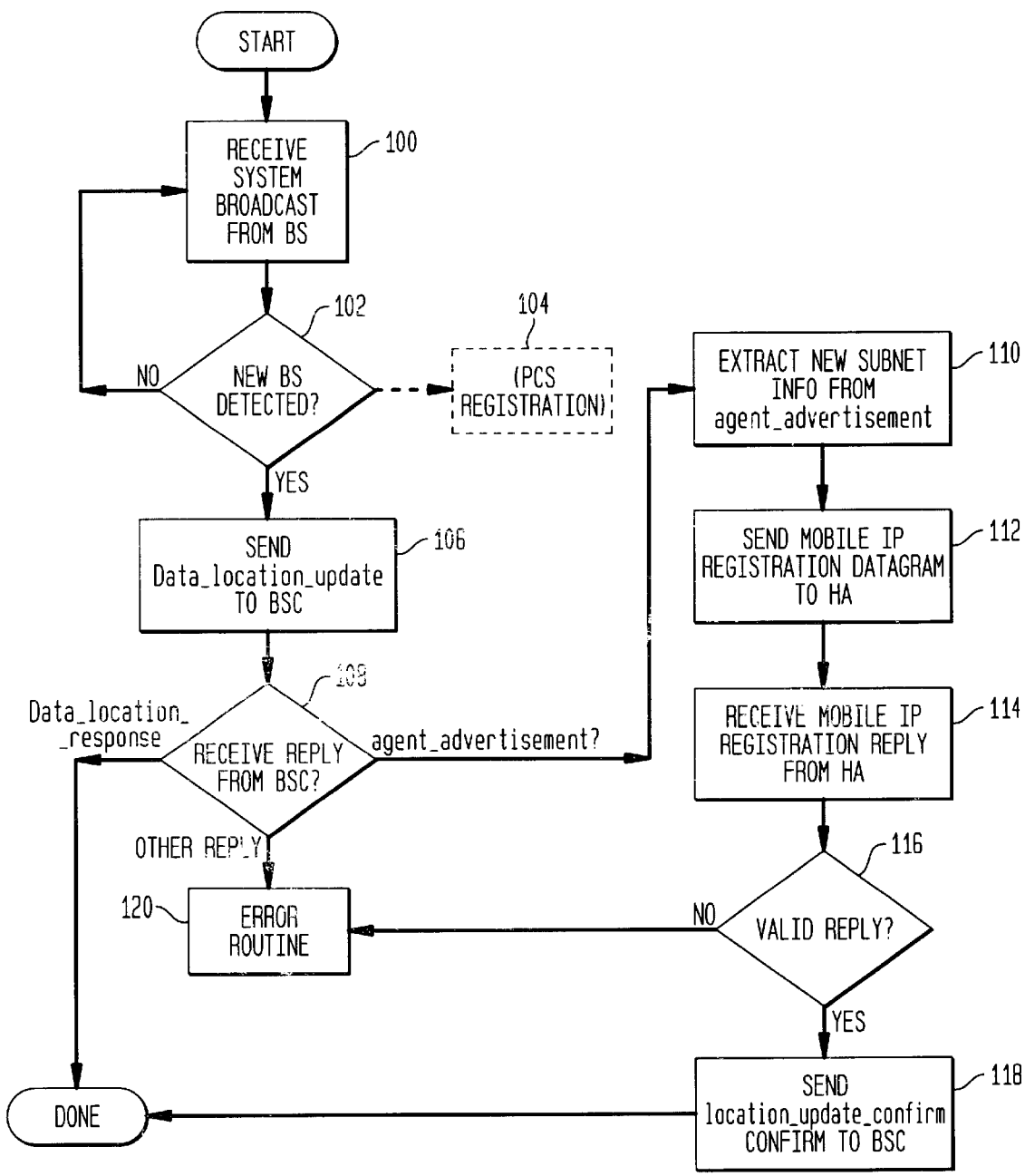
FIG. 11 is a flowchart of a mobile station data location update procedure according to the invention.

The operation of the MS during the MS registration procedure is summarized in the flow chart of FIG. 11. When the MS is operating, it periodically receives or reads system broadcasts from the BS (step 100). When the MS detects that it has moved to a new BS (step 102), it initiates a PCS registration procedure, if necessary (step 104), and then sends a Data_Location_Update message to the BSC (step 106). When the MS receives a reply from the BSC (step 108), it determines the type of reply received. If BSC's reply is a Data_Location_Response, the data registration procedure is complete. However, if an Agent_Advertisement is received, information identifying the new subnet is extracted from the Agent_Advertisement (step 110) and a Mobile IP registration datagram, including subnet identification data, is sent to the HA (step 112). After the MS receives a Mobile IP Registration Reply from the HA (step 114), it determines if the HA's response is valid (step 116). If so, a Location_Update_Confirm message is sent to the BSC (118), after which the registration procedure is complete. If the MS receives an unexpected reply from the BSC or an invalid reply from the HA, an error routine may be accessed (step 120).

Figure 12:
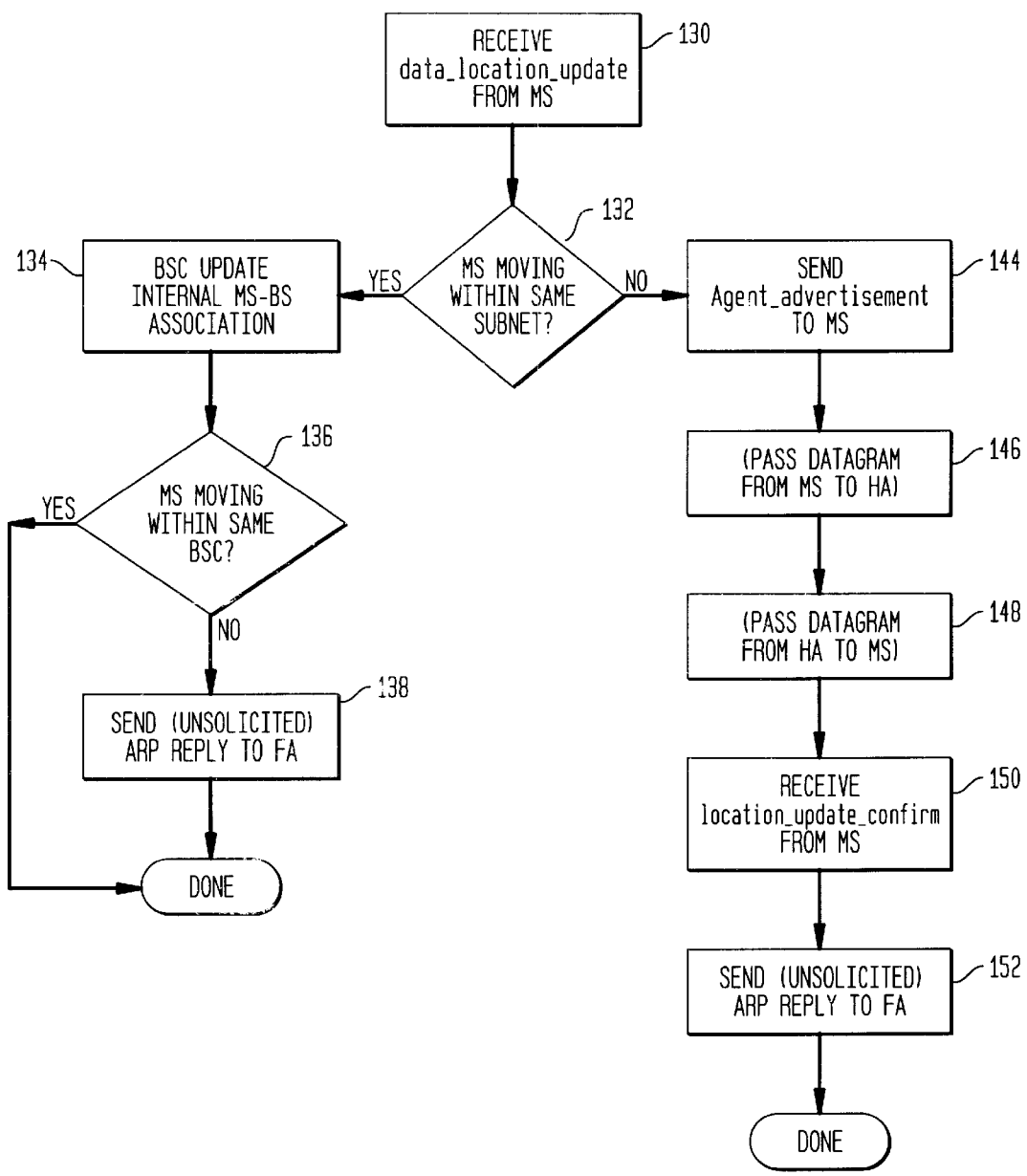
FIG. 12 is a flowchart of a base station controller data location update procedure according to the invention.

The operation of the BSC during MS registration procedures is summarized in the flow chart of FIG. 12. A BSC is first made aware that an MS has initiated a registration procedure when it receives a Data_Location_Update signal from the MS (step 130). The BSC analyzes the data in the received signal and determines whether the MS has moved within the same subnet or from a different subnet (step 132). If the move is within the same subnet, the BSC updates its MS-BS association table (step 134). If the MS has moved to a different BS under the same BSC (step 136), the BSC takes no further action. If the MS has come from a different BSC, the present BSC sends an unsolicited ARP reply to the FA so that it will update its routing information appropriately (step 138).

If the MS has moved from a different subnet, the BSC sends an Agent_Advertizement containing information about the present subnet to the MS (step 144). The BSC passes transmission of datagrams between the MS and the FA/HA (steps 146, 148) and awaits receipt of a Location_Update_Confirm signal from the MS (step 150). In response, the BSC sends an ARP reply to the FA (step 152).

Once an MS has completed its Mobile IP registration (and a PCS registration, if required), it can exchange data packets with other hosts on the Internet. Exchange of data packets is performed via Internet protocols in conjunction with packet protocols over the air interface. Packet exchange will be summarized below.

In general, the GR 32 acts as a gateway between the PCS data network and the Internet. If multiple subnets are connected to a single GR, the GR routes incoming datagrams to the appropriate subnet. In addition, as shown in FIG. 3, multiple GRs can be present within a PCS network and are generally interconnected to route packets between subnetworks in the PCS network. While the HA and FA have been discussed above as distinct program modules, the FA and HA functions may be combined and implemented in the GR. In this scenario, when the MS is in the home subnet, the GR routes the datagrams to the appropriate home subnet. When the MS is visiting another subnet, the MS registers with the FA, and the HA routes the datagrams to the corresponding COA of the FA. In another embodiment, only the HA functions are implemented in the GR while the FA functions are implemented within each individual subnet.

Figure 7:
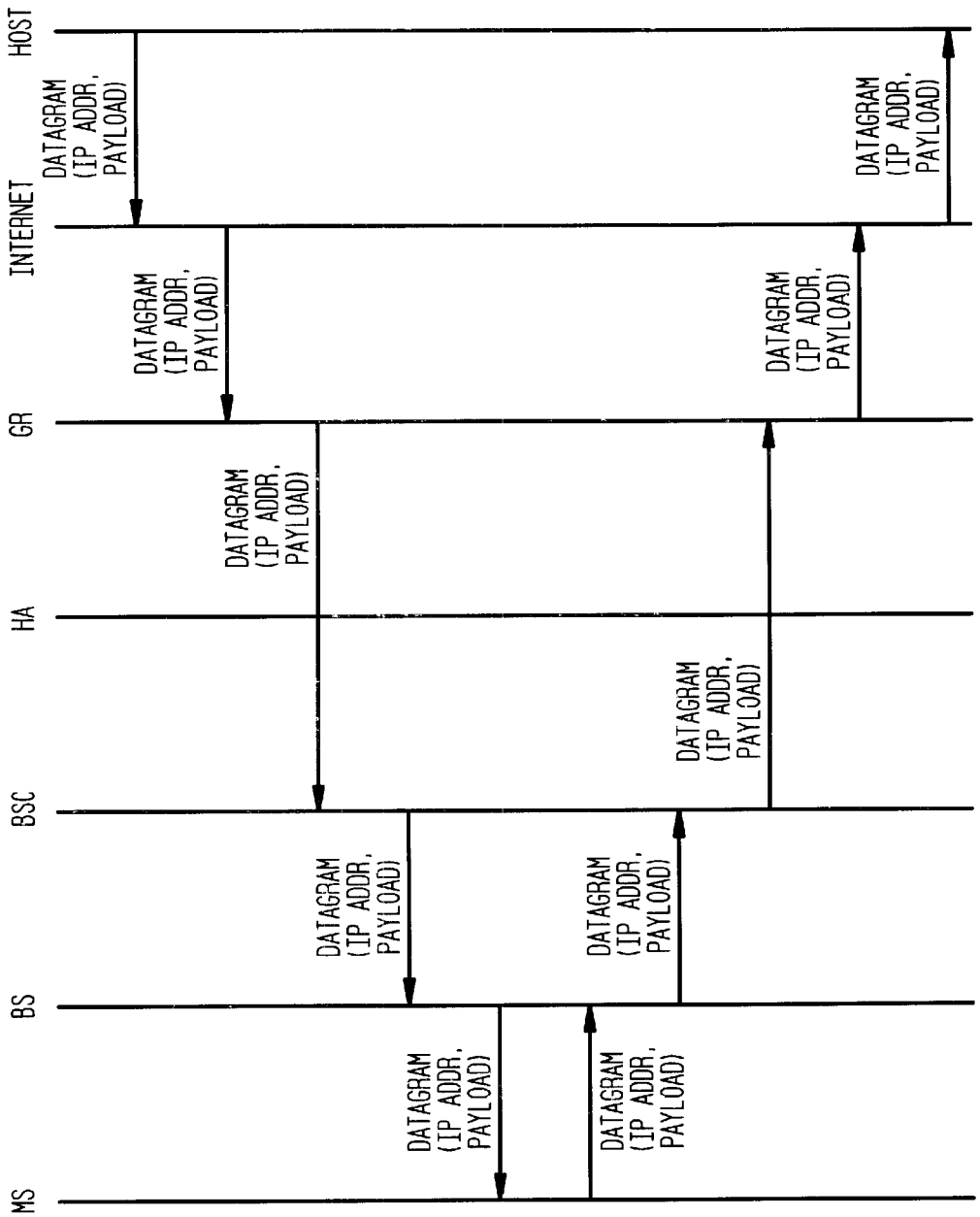
FIG. 7 is a flow diagram of a datagram exchange between a mobile station in its home subnet and an Internet host.
Figure 8:
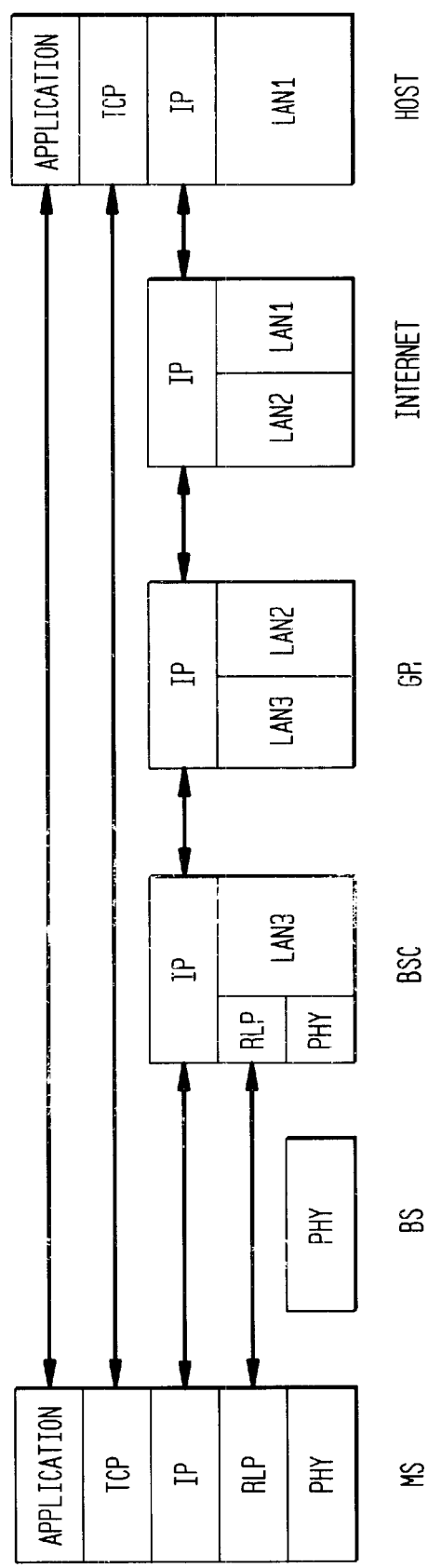
FIG. 8 is an illustration of the protocol layers used at various locations to support the datagram exchange of FIG. 7.

Turning to FIG. 7, there is shown a datagram exchange between a host 36 located on the Internet and an MS 18 in its home subnet. The host on the Internet sends datagrams to the MS using its permanent IP address. The host is unaware that the MS is a mobile station. The datagrams are routed through the Internet and to the GR serving as a gateway to the PCS network. The GR accesses its ARP cache and determines the present association between the MS=s IP address and the hardware address of the BSC serving the MS. The GR then forwards the datagrams to the hardware address of the BSC serving the MS. Because the same hardware address may be serving multiple MSs, the BSC reads the IP header to determine the appropriate MS. Using the MS-BS association table accessible to the BSC, the BSC determines which BS is currently serving the MS. The BSC then forwards the datagramn to that BS using the appropriate protocol and instructs the BS to broadcast the datagram to the MS, generally as a series of lower layer link fragments. In the other direction, the MS sends datagrams to the BSC (through the BS) and the BSC passes them to the GR. The GR then forwards the datagrams to the Internet where they are routed to the host. FIG. 8 is an illustration of a preferred protocol stack which supports the datagram exchange shown in FIG. 7.

Figure 9:
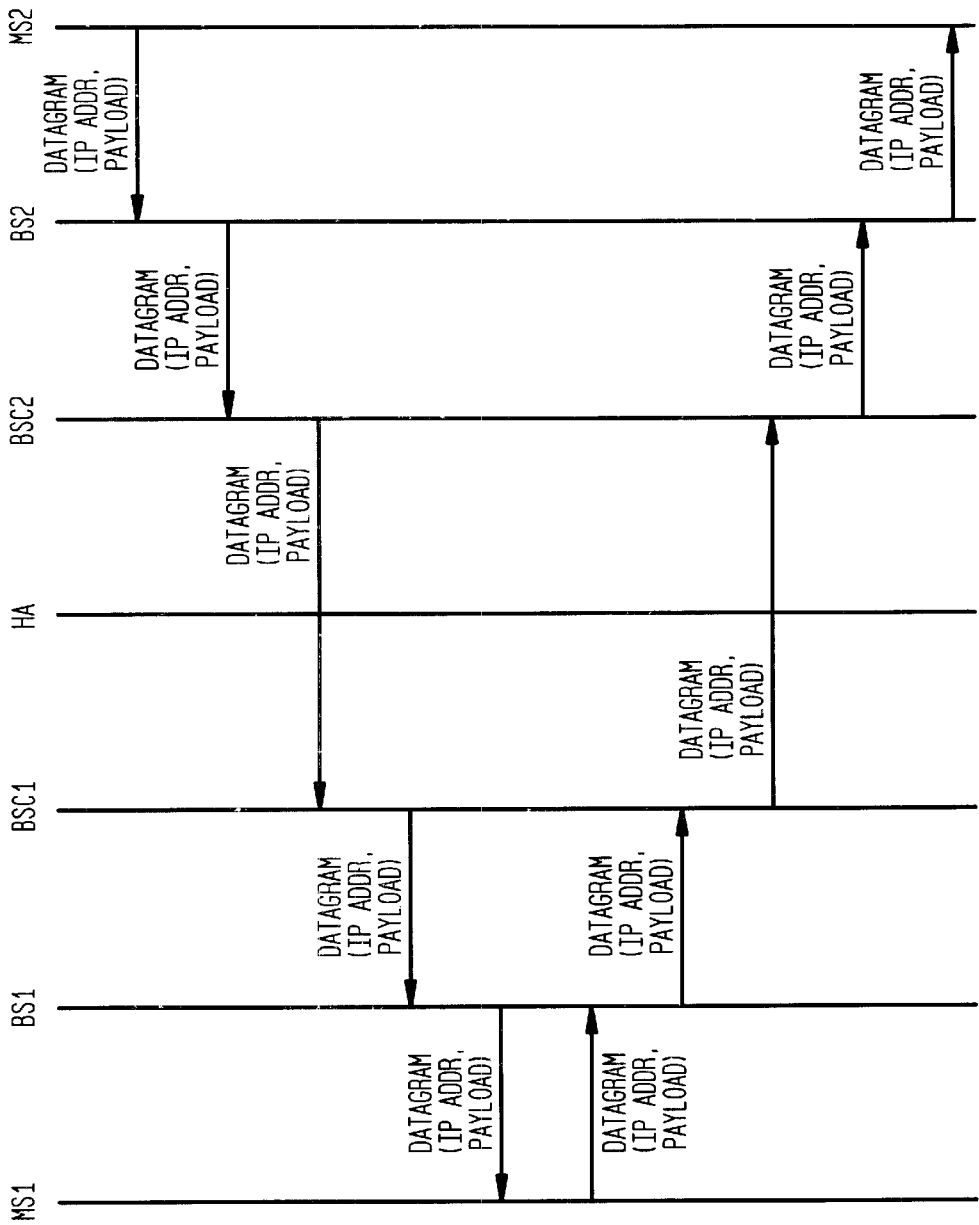
FIG. 9 is a flow diagram of a data exchange between two mobile stations at the same home network.

FIG. 9 is an illustration of a data exchange between two MSs, each having the same home subnet and each connected to a respective BSC. The ARP cache maintained within each BSC contains the correct BSC hardware addresses for each MS connected to the subnet. As a result, datagrams can be routed directly between the two BSCs and there is no need for the data communication to pass through the GR.

While the present invention is primarily concerned with registration of mobile stations as they move throughout the network, a further feature of the present system is data handoffs when the MS switches from one BS to another while data transmissions are ongoing. Datagram exchange between MSs and BSCs is via protocols which are generally specific to the PCS technology. Conventional protocols involve fragmenting and segmenting the datagrams and transmitting them over the air interface where they are reassembled at the receiving end. In this context, a BS acts like a simple radio modem and does not generally participate in the data link layer protocols. The radio channel experiences variable channel quality and an error rate much larger than can be tolerated by data applications.

Advantageously, the use of a radio link protocol ("RLP") between the MS and the BSC provides additional protection by detection of errors and retransmission of corrupted data segments. The RLP improves the error performance over the radio channel. In addition to channel fluctuations, as the MS moves from one BS to another, the radio link between the MS and a BS may be broken and reestablished and segments or fragments may be lost during the handoffs. The BSC provides an anchor for handoff and provides flow control between the MS and the BSC, thus ensuring that datagrams can be reconstructed at the BSC or the MS and providing an environment wherein the error rates experienced by the datagrams are comparable to error rates experienced in wireline LANs and the Transmission Control Protocol ("TCP") performance is not degraded.

While sufficient for handoffs under the same BSC, additional measures are preferably implemented to properly handle inter-BSC handoffs, Two primary embodiments are considered. However, different methodologies may also be used.

In a first embodiment, the handling of data errors introduced by inter-BSC handoffs is delegated to the TCP layer. Under the standard procedures followed in TCP/IP networks, a TCP layer will automatically retransmit the TCP layer packet if any of the IP datagrams in it have been dropped by the IP layer. While this is an acceptable procedure from TCP/IP the protocol point of view, this may lead to poor throughput performance if the probability of losing an IP datagram is higher than normally expected in wired networks since the TCP/IP servers are generally optimized for use in non-mobile systems.

In a second embodiment, the BSC is configured with appropriate software to forward undelivered datagrams to the new BSC. This arrangement will be discussed with reference to the flow diagram in FIG. 10. Procedures to forward undelivered datagrams from one BSC to another can be easily incorporated into the BSC program. However, if the two BSCs are in different subnets, datagrams should be forwarded from the old FA to the GR after it receives the binding update from the new FA.

Figure 10:
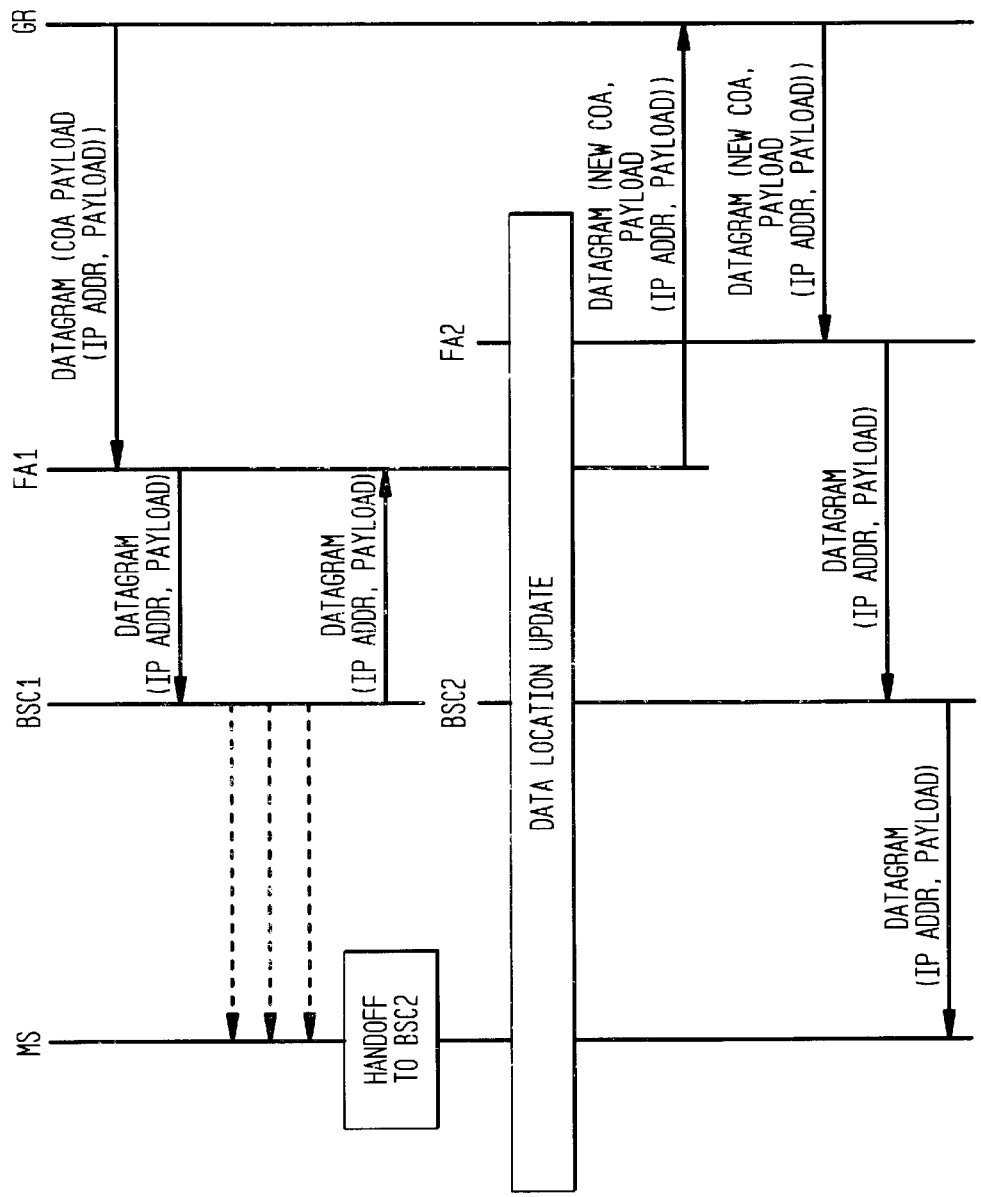
FIG. 10 is a flow diagram illustrating data handoff with datagram forwarding.

Referring to FIG. 10, the MS receives a datagram from a first BSC (BSC1) as a series of data link layer segments. In the middle of the datagram delivery, the MS moves to a new data cell, connects to a second BSC (BSC2) and performs the Data_Location_Update registration procedure. When BSC1 realizes that all the segments of the datagram could not be delivered, it forwards the datagram back to the first FA (FA1). In the meantime, the first FA (FA1) will have received the binding update from the second FA (FA2). FA1 can then forward the datagram to FA2 using the new COA of FA2 by conventional Mobile IP procedures. FA2 receives the forwarded datagram and sends it to the BSC2 for delivery to the MS.

The situation is simpler when a handoff occurs during a data transmission from the MS to the BSC. If the data link layer in the MS indicates that the datagram delivery was interrupted by a handoff, the MS retransmits it to the new BSC. If multiple copies of the same datagram are received at a downstream point, the error is resolved by either the TCP layer or the host.

According to a further aspect of the invention, the conventional air-interface in a PCS system is enhanced to permit the use of Mobile IP for data transmissions. In particular, the air interface is modified to carry the Data_Location_Update and Agent_Advertisement messages and to permit the exchange of Mobile IP message datagrams. The specific modifications required depend, to some extent, upon the underlying air interface at issue and various methods of implementation will be known to those of skill in the art.

While the invention has been particularly shown and described with reference to preferred embodiments thereof, it will be understood by those skilled in the art that various changes in form and details may be made therein without departing from the spirit and scope of the invention. In particular, while the invention has been discussed above with respect to adding IP protocol data communications to a PCS network, the broad concepts of the invention can also be applied to provide mobility data connectivity using different protocols to other types of wireless networks. For example, the invention is suitable for use to successor protocols which may be adopted for use in the Internet or another distributed network environment.

TABLE OF ACRONYMS USED IN SPECIFICATION

ARP Address resolution protocol
BS Base station
BSC Base (station) switching center
CDPD Cellular digital packet data
COA Care of address
FA Foreign agent
GPRS GSM packet radio system
GR Gateway router
GSM Global system for mobile communications
HA Home agent
IP Internet protocol
IWF Interworking function
LAN Local Area Network
MS Mobile station
MSC Mobile (station) switching center
PCS Personal communication services
PHY Physical data link
PPP Point-to-Point Protocol
PSTN Public switched telephone network
RLP Radio Link Protocol
TCP Transmission Control Protocol
UDP User Datagram Protocol

What is claimed is:

1. A method for providing data communication to mobile stations (MS) connected to a first data network comprising a plurality of base stations (BS) communicating with the MSs and connected to a respective one of a plurality of base station switching centers (BSCs), the BSCs connected to a mobile station switching station (MSC) and configured to direct voice traffic from the MS to the MSC, the method comprising the steps of:

providing at least one gateway router (GR) connected between the BSCs and a second data network;

configuring each BSC as a node suitable for routing data traffic between a connected MS and the GR;

defining at least one subnet, each subnet including at least one BSC;

assigning a permanent address to an MS and associating the MS with a home subnet;

assigning a care-of address to the MS in response to the detection that the MS is connected to a BSC not in the MS's home subnet;

directing data traffic from the MS to the GR; and routing data traffic received from a remote site and directed to the MS's permanent IP address, whereby, when the MS is connected to a BSC not in the MS's home subnet, the received data traffic is forwarded to the MS's care-of address.

2. The method of claim 1, wherein the first data network includes a PCS data network.

3. The method of claim 1, wherein:

the second data network includes the Internet;

the data traffic includes IP data traffic; and the permanent address includes an IP address;

whereby the method provide seamless IP data connectivity between an MS and the Internet.

4. The method of claim 1, further comprising the step of:

maintaining in a home mobility agent associated with each subnet, the current location of each MS in the network having the respective subnet as its home subnet.

5. The method of claim 4, further comprising the step of:

providing a foreign mobility agent associated with each subnet configured to enable IP data communications with an MS connected to the respective subnet and having a different subnet as its home subnet.

6. The method of claim 5, wherein the home and foreign mobility agents are separate computer modules.

7. The method of claim 5, further comprising the steps of:

detecting when the MS has moved from a previous BS to a new BS; and determining the relationship between the BSC connected to the previous BS and the BSC connected to the new BS.

8. The method of claim 7, further comprising the steps of:

storing an ID of the previous BS in the MS; and periodically transmitting from each BS a system broadcast comprising the ID of the transmitting BS;

the detecting step comprising sending a notification to the BSC connected to the new BS when the BS ID stored in the MS is different from the BS ID in a received system broadcast, the notification indicating the MS's permanent address, its home subnet, and, if valid, its care-of address.

9. The method of claim 8, wherein the determining step is performed in the BSC in response to a received notification from the MS.

10. The method of claim 7, further comprising the step of:

when the determining step indicates that the new BS and the previous BS are connected to a common BSC, updating a BS-MS association table in the common BSC to associate the MS with the new BS.

11. The method of claim 10, wherein the BS-MS association table is stored in the common BSC.

12. The method of claim 7, when the determining step indicates that the new BS and the previous BS are connected to different BSCs in the same subnet, further comprising the steps of:

(a) updating a BS-MS association table in the BSC of the new BS to associate the MS with the new BS, and (b) updating address binding information in at least one of the home and foreign mobility agents of that same subnet to thereby associate the MS with the BSC of the new BS.

13. The method of claim 7, when the determining step indicates that the new BS and the previous BS are connected to different BSCs in different subnets, further comprising the steps of:

sending an advertisement message from the BSC of the new BS to the MS containing registration information, the care-of address, and attributes of the subnet containing the BSC of the new BS; and;

sending a registration message from the MS to the home agent of the MS's home subnet containing the MS's permanent address and at least some of the information in the advertisement message;

updating the current location of the MS as maintained by the home agent of the MS's home subnet in accordance with data in the registration message; and sending a reply from the home agent of the MS's home subnet to the MS indicating a successful registration.

14. The method of claim 13, wherein the attributes comprise an identification of the foreign agent for the subnet containing the BSC of the new BS.

15. The method of claim 13, further comprising the steps of:
   in response to the receipt of a successful registration reply, sending a registration confirmation message from the MS to the BSC of the new BS; and;
   updating a BS-MS association table in the BSC of the new BS to associate the MS with the new BS.

16. The method of claim 1, wherein all BSCs in given subnet are connected to a common node;
   the step of directing data traffic from the MS to the GR comprises the steps of:
   determining if the data traffic is directed to a second MS present in the same subnet;
   in response to a positive determination, directing the data traffic from the MS to the second MS without involving the GR;
   otherwise directing the data traffic to the GR.

17. A system integrating a first network with a second network comprising:
   a mobile switching station (MSC);
   a plurality of base station switching centers (BSCs) connected to the MSC;
   at least one base station (BS) connected to each BSC, each base station providing an access point to the network for at least one mobile station (MS), each MS having a permanent address and being associated with a home subnet comprising at least one BSC;
   at least one gateway router (GR) connected to the second network;
   each BSC connected to a particular GR and configured as a node suitable for routing data traffic between an MS and the GR;
   each BSC further configured to:
   (a) direct voice traffic from the MS to the MSC,
   (b) directing data traffic from the MS to the GR;
   (c) assign, with the aid of a foreign mobility agent associated with the subnet containing the BSC, a care-of address to the MS in response to the detection that the MS is connected to a BSC not in the MS's home subnet;
   (d) route, with the aid of a home mobility agent associated with the subnet containing the BSC and maintaining the current location of each MS in the network having the respective subnet as its home subnet, data traffic received from a remote site and directed to the MS's permanent address, whereby, when the MS is connected to a BSC not in the MS's home subnet, the received data traffic is forwarded to the MS's care-of address.

18. The system of claim 17, wherein the first data network includes a PCS data network.

19. The system of claim 17, wherein:
   the second data network includes an IP data network;
   the data traffic includes IP data traffic; and
   the permanent address includes an IP address.

20. The system of claim 19, wherein the second data network includes the Internet.

21. The system of claim 17, wherein each subnet comprises a single home mobility agent and a single foreign mobility agent, the home and foreign mobility agents being shared by all BSCs in a respective subnet.

22. A mobile station for use with an integrated PCS and IP network accessible through a plurality of base stations (BSs), each base station having an ID and connected to a base station switching center (BSC), each BSC belonging to a subnet comprising at least one BSC, the mobile station comprising:
   a control system having a computer processor and a memory;
   a radio link transceiver for communicating with base stations (BSs) in the network, each base station having an ID;
   the control system configured to:
   receive system broadcasts containing a BS ID from an accessed BS;
   detect if the accessed BS is different from a previously accessed BS;
   in response to the detection that a new BS has been accessed, sending a Data_Location_Update message to a base station switching center (BSC) connected to the new BS;
   receive communications from the BSC;
   in response to the receipt of an Agent_Advertisement from the BSC:
   (a) extract subnet information from the Agent_Advertisement, the subnet information including attributes of the subnet containing the BSC; and
   (b) send a Mobile_IP_Registration datagram to a mobility agent associated with a home subnet assigned to the mobile station including the received subnet information.

23. The mobile station of claim 22, wherein the control system is further configured to:
   receive a Mobile_IP_Registration reply from the mobility agent; and
   upon receipt of a valid reply, send a Location_Update_Confirm message to the BSC.

24. The mobile station of claim 22, wherein:
   the mobile station is configured to receive a permanent IP address; and
   the Data_Location_Update message includes the permanent IP address.

25. The mobile station of claim 22, wherein the control system is configured to initiate a PCS registration procedure in response to the detection that a new BS has been accessed when the new BS is in a different PCS network than the previously accessed BS.

26. A base station switching controller (BSC) for use in an integrated PCS and IP network accessible through a plurality of base stations (BSs), each base station having an ID and connected a respective BSC where each BSC belongs to a subnet comprising at least one BSC, the BSC comprising:
   a control system having a computer processor and a memory;
   a first data interface for communicating with at least one BS;
   a second data interface for communicating with a mobility agent associated with the subnet to which the BSC belongs and for passing IP data communications between a mobile station connected to the BSC through a BS and a gateway router in communication with the BSC;
   the control system configured to:
   (a) receive a Data_Location_Update message from a mobile station (MS) in communication with the BSC through a first BS indicating that the MS has moved from a second BS to the first BS;

(b) determining if the subnet of the BSC is the same as a subnet for a second BSC of the second BS; and (c) updating an MS-BS association table in the memory to associate the MS with the second BS if the subnets are the same.

27. The base station switching controller of claim 26, wherein the control system is further configured to send an address resolution protocol (ARP) reply to the mobility agent associated with the subnet of the BSC if the second BSC and the BSC are different units.

28. The base station switching controller of claim 27, wherein the control system is further configured to:

(d) send an Agent_Advertisement to the MS following receipt of the Data_Location_Update message and a determination that the subnet of the BSC and the subnet for the second BSC are different;

(e) receive a Location_Update_Confirm message from the MS; and (f) send an ARP reply to the mobility agent associated with the subnet of the BSC.

* * * * *